United States Patent [19]

Lee

[11] Patent Number: 5,757,805
[45] Date of Patent: May 26, 1998

[54] SIGNALING INFORMATION PROCESSING APPARATUS FOR USE IN AN ELECTRONIC SWITCHING SYSTEM

[75] Inventor: Sung-Bae Lee, Incheon, Rep. of Korea

[73] Assignee: Daewoo Telecom Ltd., Incheon, Rep. of Korea

[21] Appl. No.: 716,132

[22] Filed: Sep. 20, 1996

[30] Foreign Application Priority Data

Oct. 31, 1995 [KR] Rep. of Korea ............ 95-38860

[51] Int. Cl.⁶ .............. H04J 3/02; H04M 7/00
[52] U.S. Cl. .............. 370/522; 379/230
[58] Field of Search ........... 370/250, 252, 370/360, 373, 377, 384, 389, 392, 496, 522; 364/131; 379/299, 230

[56] References Cited

U.S. PATENT DOCUMENTS

| | | | |
|---|---|---|---|
| 5,420,916 | 5/1995 | Sekiguchi | 379/230 |
| 5,521,902 | 5/1996 | Ferguson | 370/522 |
| 5,550,914 | 8/1996 | Clarke et al. | 379/230 |
| 5,579,371 | 11/1996 | Aridas et al. | 370/522 |

*Primary Examiner*—Chi H. Pham
*Assistant Examiner*—Ricky Q. Ngo
*Attorney, Agent, or Firm*—Pennie & Edmonds LLP

[57] ABSTRACT

A novel apparatus effectively processes signaling information to be communicated between an electronic switching system (ESS) and at least one other ESS. In case of transmitting a plurality of signaling information from one ESS to the other ESS's, a plurality of signaling data is first provided from corresponding user parts contained in the ESS to a signaling message handler wherein they are routed to corresponding signaling links. Next, at a signaling link processor, the status of all the signaling links formed between the ESS and the other ESS's and the status of each of the plurality of signaling data are checked and analyzed to generate information representing their status. Using the plurality of the signaling data and generated information, a corresponding number of signaling units are formed for the reliable transmission thereof. Finally, the plurality of signaling units are relayed to a block that interfaces and transmits each of them to the other ESS's.

9 Claims, 2 Drawing Sheets

SIGNALING INFORMATION PROCESSING APPARATUS FOR USE IN AN ELECTRONIC SWITCHING SYSTEM

FIELD OF THE INVENTION

The present invention relates to a signaling information processing apparatus for use in an electronic switching system; and, more particularly, to an apparatus which is capable of effectively processing signaling information communicating between the system and at least one other system.

BACKGROUND OF THE INVENTION

As is well known, an electronic switching system (ESS) selectively connects two assigned subscribers out of many so as to establish a communication line between them.

Basic components of the ESS include a multiplicity of access switching subsystems (ASS's), an interconnection network subsystem (INS) and a central control subsystem (CCS). Each ASS includes a plurality of subscriber interfacing units and a time division switching unit to communicate information between two selected subscribers. When the two selected subscribers are coupled to an ASS, they are connected within the same ASS. On the other hand, when the two selected subscribers are coupled to two different ASS's, they are interfaced to the INS and connected within the INS. The INS, coupled with each of the ASS's and the CCS, includes a central data link module and a space division switching unit and connects the two selected subscribers. Finally, the CCS coupled with the ASS's and the INS controls all the operations and maintenance processes of the ESS.

The ESS further includes a signaling information processing apparatus which is coupled to the INS and is used to process signaling information to be communicated between the ESS and at least one other ESS by employing a conventional signaling information processing method. As is well known, the signaling information is not subscriber information but control information to be used to efficiently manage communication networks formed therebetween.

The signaling information processing apparatus includes a signaling information handling processor board assembly (SHPA), having a signaling information handling processor (SIHP) and a rate adaption (RA) module, and a signaling terminal circuit board assembly (STCA) module having a plurality of STCA's, wherein the RA module has a multiplicity of RA devices.

Specifically, in case of transmitting a plurality of units of signaling information from the ESS to other ESS's, a plurality of signaling data are is first provided to the SIHP. Each signaling data contains user data, routing label data having its destination point code and signaling link code, and service indicator data; and is issued by one of higher processors (user parts) within the ESS according to one of the conventional protocols, e.g., signaling system number 7 (SS7) protocol, well known in the art.

The SIHP, in a signaling network layer of the SS7 protocol that corresponds to a layer 3 of an open system interconnection (OSI) model, maps signaling links to be used in transmitting each signaling data in response to the signaling link code contained therein. Thereafter, the signaling data and link information mapping the signaling links are transmitted from the SIHP via a known bus to each of the STCA's.

Each STCA carries out a series of processes to reliably transmit each signaling data via one of the signaling links mapped that is responsive to the link information by utilizing a signaling link layer of the SS7 protocol that corresponds to a layer 2 of the OSI model. That is, each STCA checks whether each signaling data from the SIHP is valid or not and the status of the signaling links mapped between said each STCA and that of the other ESS. Next, based on the checked result, each signaling data is converted to one of three types of signaling units, e.g., a message signal unit (MSU), a link status signal unit (LSSU) and a fill-in signal unit (FISU), that are adapted for use in the signaling link layer for the reliable transmission thereof. As is well known, the MSU is employed to carry signaling data only and the LSSU is utilized by an ESS to inform its status to another ESS, while the FISU is used to control the operation of the signaling link mapped when there is neither the MSU nor the LSSU. Each signaling unit has a different bit length and includes a start and an end flags and check bits, and information representing the sequence thereof.

Subsequently, each signaling unit converted by a STCA is transmitted to a corresponding RA device via the corresponding signaling link, wherein each RA device is capable of processing several of the plurality of signaling units, e.g., four signaling units. Finally, at each RA device, the transfer rate, e.g., 64 Kbps, of each of the four signaling units applied thereto is converted to a predetermined identical transfer rate, e.g., 2.048 Mbps, thereby transmitting the signaling units to other corresponding ESS's via a subhighway equipped with channels capable of carrying them.

Reception of the signaling units transmitted from a signaling information processing apparatus in another ESS is carried out in a similar method, wherein each signaling unit is one of the MSU, the LSSU and the FISU. Specifically, if the signaling units from the other ESS's are applied to each of the RA devices, each of them extracts several of the signaling units, e.g., four signaling units, that are responsive to four control data stored therein. Next, each of the RA devices converts the transfer rate, e.g., 2.048 Mbps, of each of the four signaling units to a predetermined identical transfer rate, e.g., 64 Kbps. Each signaling unit converted by a RA device is then fed to a corresponding STCA via a signaling link coupled therebetween.

Each STCA is known to perform a series of processes to turn potentially unreliable signaling links between itself and a different STCA in another ESS into reliable signaling links based on the signaling link layer. That is, at each STCA, a flow control, an error monitoring and an error control operations for each signaling unit are carried out by using the start and the end flags, the check bits and the information representing the sequence thereof.

Each signaling unit processed by a corresponding STCA is then provided via a known bus to the SIHP, wherein a discrimination, a distribution and a routing operations therefor, and signaling network management functions are performed based on the signaling network layer. Specifically, the SIHP first checks whether the type of each signaling unit applied thereto is the MSU or not. Next, it determines whether or not each of them is delivered to its destination in response to the destination point code contained therein if the checked result is positive; and executes the signaling network management functions if otherwise. Finally, each signaling unit is delivered to a corresponding higher processor of the ESS for further processing in response to the service indicator data included therein if the decision result is affirmative; and is provided to a processor for routing to another ESS in response to the destination point code thereof if otherwise.

However, in the conventional signaling information processing apparatus, errors may sometimes occur in any of the four RA devices due to a fault or malfunctioning thereof. This may result in a reduction of the total number of channels accommodated in the ESS. Further, in the apparatus, it is designed to separately couple the outputs from each of the four RA devices with the STCA's, thereby rendering the signaling information processing apparatus structurally complex.

SUMMARY OF THE INVENTION

It is, therefore, a primary object of the present invention to provide a signaling information processing apparatus, for use in an ESS, which is capable of effectively processing signaling information communicating between the ESS and at least one other ESS, thereby improving the performance of the ESS.

It is another object of the present invention to provide a signaling information processing apparatus having a simple structure.

In accordance with one aspect of the invention, there is provided an apparatus, for use in an electronic switching system (ESS), for outputting a plurality of signaling units to transmit them to at least one other ESS via a first set of signaling links connected therebetween, respectively, wherein each signaling unit represents control information employed for the management of communication networks formed therebetween, which comprises:

- a processor for receiving a plurality of signaling data from user parts contained in the ESS, wherein each signaling data includes user data, routing label data having its signaling link code and destination point code, and service indicator data, and for routing each of them to a corresponding second set of signaling links in response to the signaling link code contained therein;
- a circuit for checking the status of each of the first and the second sets of signaling links and analyzing the status of each signaling data to thereby generate information representing the status of each of the first and second sets of signaling links and said each signaling data;
- a forming unit, based on the generated information at the checking circuit, for forming the plurality of signaling units by using their corresponding signaling data, wherein each signaling unit includes overhead information such as a start and an end flags, check bits, and information representing the sequence thereof; and
- an interfacing circuit for interfacing the plurality of signaling units to the first set of signaling links, respectively, to thereby transmit the plurality of signal units to other ESS's.

In accordance with another aspect of the invention, there is provided an apparatus, for use in an electronic switching system (ESS), for processing a plurality of signaling units received by the ESS through a first set of signaling links from at least one other ESS, wherein each of the plurality of signaling units represents control information employed for the management of communication networks formed therebetween, which comprises:

- an interfacing circuit for receiving the plurality of signaling units from the first set of signaling links and for interfacing them to a second set of signaling links, respectively, wherein each signaling unit includes overhead information such as a start and an end flags, check bits, and information representing the sequence thereof;
- a first converter for converting each signaling unit to a corrected signaling unit based on the overhead information, respectively;
- a block for determining whether or not each corrected signaling unit includes signaling data, the signaling data having user data, its signaling link code and destination point code, and service indicator data;
- a circuit, if said each corrected signaling unit includes signaling data, for discriminating whether it is delivered to its destination or not in response to the destination point code contained therein; and
- a distributer, if said each corrected signaling unit is delivered to its destination, for distributing it to a corresponding user part included in the ESS in response to the service indicator data contained therein, and, if otherwise, for routing it to a corresponding ESS in response to the signaling link code contained therein.

BRIEF DESCRIPTION OF THE DRAWING

The above and other objects and features of the present invention will become apparent from the following description of preferred embodiments with reference to the accompanying drawings, in which.

DETAILED DESCRIPTION OF THE PREFERRED EMBODIMENTS

Figure 1:
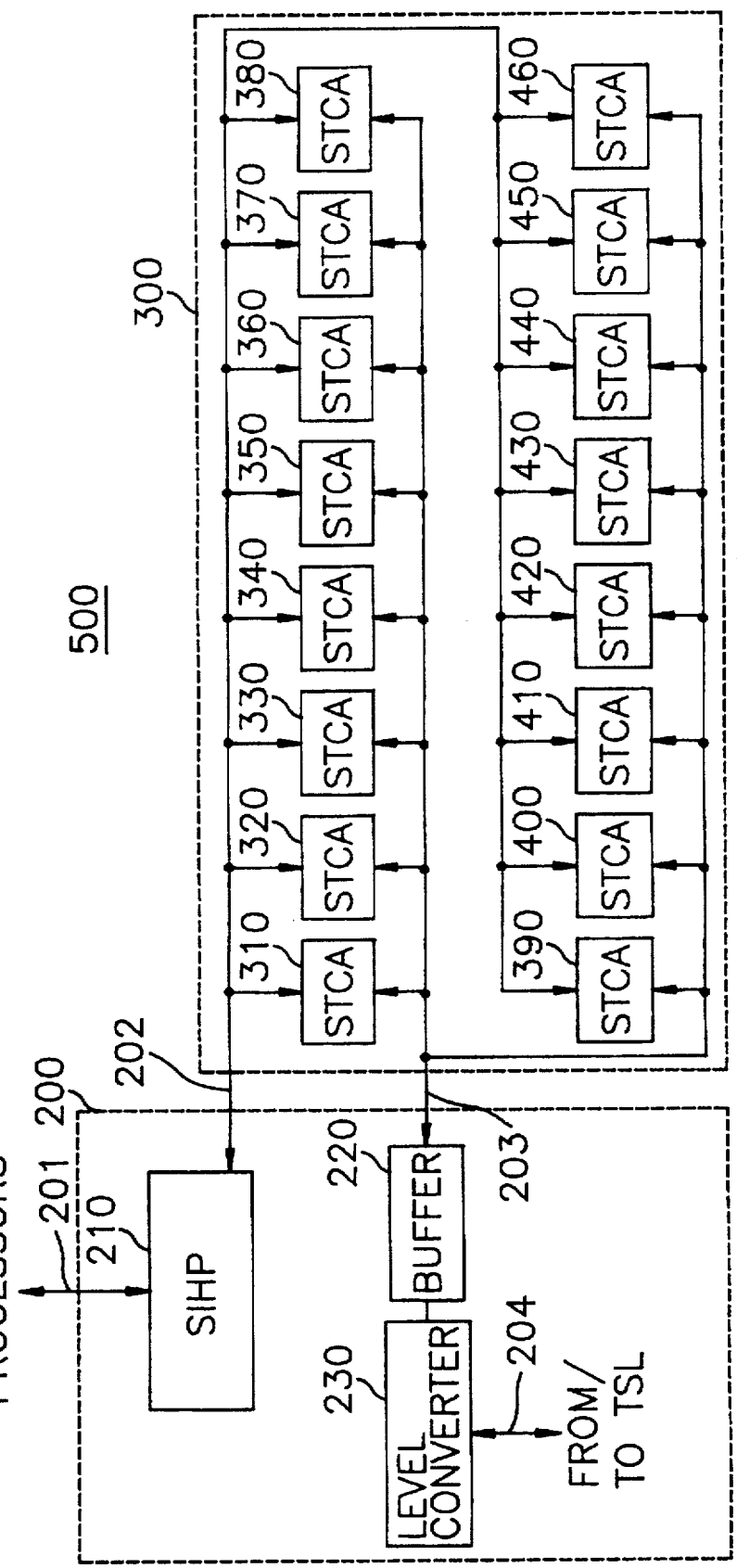
FIG. 1 is a block diagram illustrating a novel apparatus for effectively processing signaling information to be communicated between two selected ESS's in accordance with the present invention.

Referring to FIG. 1, there is provided a block diagram of a novel signaling information processing apparatus 500 of the present invention, for use in an ESS, for processing signaling information to transmit it to or receive it from at least one other ESS (not shown). As is well known, the signaling information is not subscriber information but control information employed to efficiently manage overall communication networks.

The inventive signaling information processing apparatus 500 comprises a SHPA 200 having a SIHP 210, a buffer 220 and a level converter 230, and a STCA module 300 having a multiplicity of STCA's, e.g., sixteen STCA's 310 to 460. It should be appreciated that the number of STCA's can be determined on the basis of the designed process capacities of the apparatus 500 and the SIHP 210.

For transmitting a plurality of signaling information, e.g., sixteen signaling information, from the ESS to other ESS's, sixteen signaling data is first inputted to the SIHP 210 via a global bus 201. Each signaling data contains user data, routing label data having its destination point code and signaling link code, and service indicator data, and is issued by one of higher processors (or user parts) within the ESS according to one of conventional protocols, e.g., SS7 protocol, well known in the art.

The SIHP 210, known as a signaling transfer part, maps signaling links to be used in transmitting each signaling data in response to the signaling link code contained therein in a signaling network layer of the SS7 protocol that corresponds to a layer 3 of an OSI model. Thereafter, the sixteen signaling data and link information representing their corresponding signaling links mapped are transmitted from the SIHP 210 via a signaling terminal (ST) bus 202 to each of the STCA's 310 to 460. Although it is not explicitly described for the sake of simplicity, it should be apparent to those skilled in the art that the SIHP 210 performs signaling network management functions according to the signaling network layer of the SS7 protocol.

Each of the STCA's 310 to 460 carries out a series of processes to reliably transmit each signaling data from the STP bus 202 through one of the signaling links mapped that is responsive to the link information by employing a signaling link layer of the SS7 protocol that corresponds to a layer 2 of the OSI model.

Figure 2:
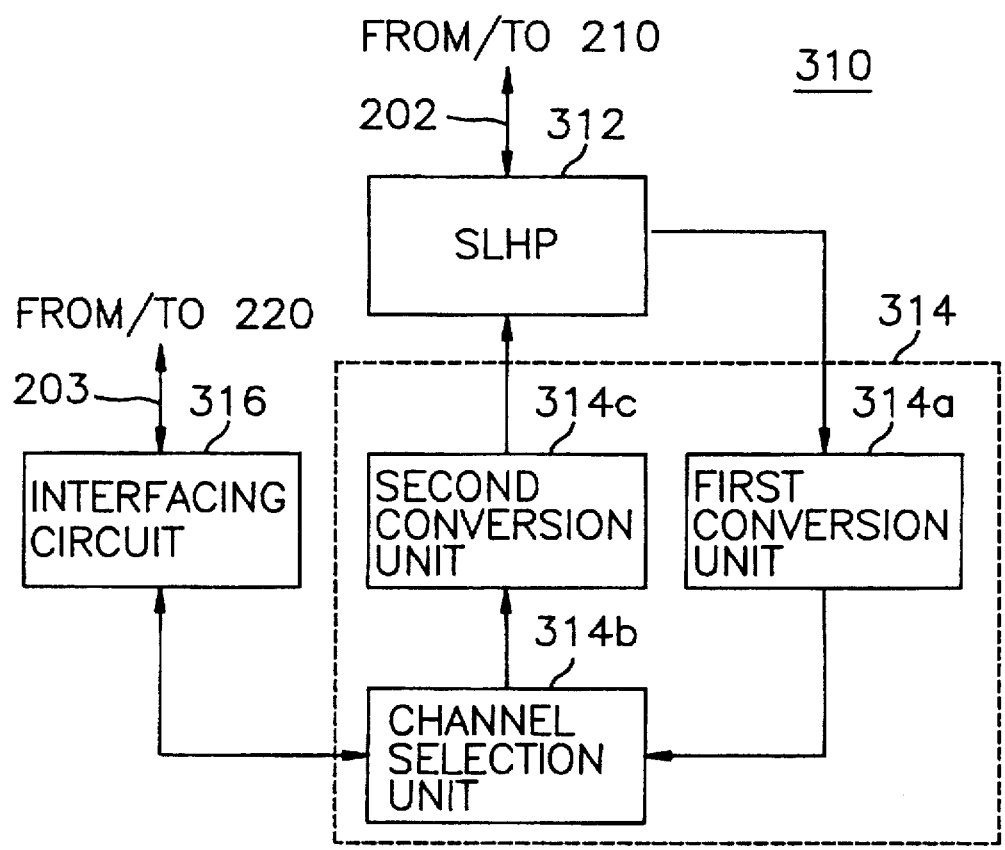
FIG. 2 presents a detailed block diagram of the first STCA shown in FIG. 1.

Turning now to FIG. 2, there is depicted a detailed block diagram of only one of the STCA's 310 to 460, e.g., 310, of the present invention shown in FIG. 1 for the sake of simplicity. The STCA 310 includes a signaling link handling processor (SLHP) 312, a RA device 314 having a first and a second conversion units 314a and 314c and a channel selection unit 314b, and an interfacing circuit 316. Specifically, the SLHP 312, equipped with a firmware capable of processing all the sixteen signaling data based on the signaling link layer, analyzes whether each of the sixteen signaling data is valid or not, and checks the status of each of the signaling links mapped between the SLHP 312 and a SLHP (not shown) of the other ESS's.

And then, based on the analyzed and checked results, each signaling data is converted to one of three types of known signaling units, e.g., a MSU, a LSSU and a FISU, that are adapted to use in the signaling link layer for the reliable transmission thereof. As is well known, the MSU is employed to carry signaling data only and the LSSU is utilized for one of two ESS's to inform its status to the other, while the FISU is used to control the operation of the signaling link mapped when there is neither the MSU nor the LSSU. Each signaling unit has a different bit length and includes a start and an end flags, check bits, and information representing the sequence thereof.

Subsequently, the sixteen signaling units converted by the SLHP 312 and the link information from the ST bus 202 are delivered to the first conversion unit 314a which converts the transfer rate, e.g., 64 Kbps, of each of them inputted thereto to a predetermined identical transfer rate, e.g., 2.048 Mbps, using one of conventional rate conversion methods. The sixteen signaling units and the link information converted by the first conversion unit 314a are then relayed to the channel selection unit 314b.

At the channel selection unit 314b, one of the sixteen signaling units having the link information that is identical to identification data issued by a control unit (not shown), e.g., 1st signaling unit, is selected, the identification data representing the sequence of the STCA 310. The identification data is generally determined when the apparatus 500 is designed and stored in the control unit. Subsequently, the 1st signaling unit selected at the channel selection unit 314b is provided to the interfacing circuit 316.

At the interfacing circuit 316, the 1st signaling unit from the channel selection unit 314a is processed by employing a conventional interfacing technique so that it can be interfaced to the buffer 220 as depicted in FIG. 1. The 1st signaling unit processed by the interfacing circuit 316 is then outputted and transmitted to the buffer 220 through its corresponding signaling data link (SDI) 203.

Referring back to FIG. 1, the rest of the STCA's, i.e., 320 to 460, are substantially identical to the STCA 310 except that they select and process corresponding different signaling units, respectively. Therefore, details of the STCA's 320 to 460 are omitted here.

The sixteen signaling units processed by the STCA's 310 to 460 are delivered to the buffer 220 via the SDL 203. Although only the single SDL 203 is shown in FIG. 1 for the sake of simplicity, it should be noted that there exist sixteen SDL's, each corresponding to each signaling unit.

The buffer 220 serves to electrically interface the sixteen signaling units to the level converter 210 using one of conventional electrical interfacing techniques well known in the art. The sixteen signaling units are outputted from the buffer 220 and relayed to the level converter 230. At the level converter 230, the level, e.g., transistor transistor logic (TTL) level, of each of the sixteen signaling units is converted to a certain level, e.g., a differential level, that corresponds to the TTL level by employing a conventional level conversion method. Each of the sixteen signaling units is then transmitted via a corresponding time switch local data link (TSL) (not shown) of each of the other ESS's to the signaling information processing apparatus contained therein through a subhighway 204 and a TSL (not shown) within the ESS, wherein the subhighway 204 is equipped with channels capable of carrying the sixteen signaling units.

Reception of a plurality of signaling units transmitted from the corresponding signaling information processing apparatus within at least one other ESS's is carried out in a similar method, wherein each signaling unit is also one of the MSU, the LSSU and the FISU. Specifically, if the signaling units, e.g., sixteen signaling units, are applied from the TSL of the ESS to the level converter 230 through the subhighway 204, the level converter 230 converts the level, e.g., differential level, of each of them to a predetermined identical level, e.g., TTL level, that corresponds to the difference level by using one of conventional level conversion methods.

The sixteen signaling units converted by the level converter 230 are then provided to the buffer 220 which electrically matches each of the sixteen signaling units to each of the STCA's 310 to 460 by using a conventional electrical matching method. At each STCA, each corresponding signaling unit transmitted thereto through the SDL 203 from the buffer 220 is processed by employing the signaling link layer to turn potentially unreliable signaling links formed between said each of the STCA's and a corresponding STCA (not shown) of the other ESS's into reliable signaling links.

Referring back to FIG. 2, the interfacing circuit 316 relays the sixteen signaling units from the SDL 203 to the channel selection unit 314b by interfacing thereto by using the conventional interfacing technique, wherein one of the sixteen signaling units, e.g., 1st signaling unit, is extracted based on the signaling link code included therein and the identification data issued by the control unit. The 1st signaling unit extracted by the channel selection unit 314b is then fed to the second conversion unit 314c.

The second conversion unit 314c converts the transfer rate, e.g., 2.048 Mbps, of the 1st signaling unit to a predetermined transfer rate, e.g., 64 Kbps, by employing one of conventional rate conversion modes. Subsequently, the 1st signaling unit converted by the second conversion unit 314b is delivered to the SLHP 312 which serves to process the same based on the signaling link layer.

That is, at the SLHP 312, as mentioned above, a flow control, an error monitoring, an error control operations for the 1st signaling unit are carried out by using the start and the end flags, the check bits and the information representing its sequence therein. Through such operations, all the signaling links for carrying the 1st signaling unit can be stably operated, thereby receiving the 1st signaling unit through the stable signaling links without having errors therein. The 1st signaling unit processed by the SLHP 312 is then transmitted onto the ST bus 202 capable of accommodating a plurality of signaling units, e.g., the sixteen signaling units.

As described above, the rest of the STCA's, 320 to 460, are substantially identical to the STCA 310; and, therefore, details of them are omitted here for the sake of simplicity. Outputs from the STCA's 310 to 460 are then provided onto the ST bus 202 and delivered to the SIHP 210 shown in FIG. 1.

Referring back to FIG. 1, in the SIHP 210, a discrimination, a distribution and a routing operations for each of the sixteen signaling units are performed based on the signaling network layer. Specifically, the SIHP 210 first checks whether the type of each of the sixteen signaling units applied thereto is the MSU or not. Next, it determines whether or not each of the sixteen signaling units is delivered to its destination in response to the destination point code contained therein if the checking result is positive.

Finally, said each of the sixteen signaling units is delivered to a corresponding higher processor of the ESS for further processing in response to the service indicator data included therein if the decision result is affirmative; and is provided to a processor for routing to a signaling information processing apparatus of corresponding one of the other ESS's in response to the destination point code thereof if otherwise. On the other hand, if the type of each of the sixteen signaling units is not the MSU, the SIHP 210 executes the signaling network management functions to overcome the signaling link degradations. As shown above, therefore, the present invention can effectively process signaling information to be communicated between an ESS and the other ESS's using a novel signaling information processing scheme, thereby improving the performance of the ESS.

While the present invention has been shown and described with respect to the particular embodiments, it will be apparent to those skilled in the art that many changes and modifications may be made without departing from the spirit and scope of the invention as defined in the appended claims.

What is claimed is:

1. An apparatus, for use in an electronic switching system (ESS), for outputting a plurality of signaling units to transmit them to at least one other ESS via a first set of signaling links connected therebetween, respectively, wherein each signaling unit represents control information employed for the management of communication networks formed therebetween, which comprises:

routing means for receiving a plurality of signaling data from user parts contained in the ESS, wherein each signaling data includes user data, routing label data having its signaling link code and destination point code, and service indicator data, and for routing each of them to a corresponding second set of signaling links in response to the signaling link code contained therein;

means for checking the status of each of the first and the second sets of signaling links and analyzing the status of each signaling data to thereby generate information representing the status of each of the first and the second sets of signaling links and said each signaling data;

forming means, based on the generated information at the checking means, for forming the plurality of signaling units by using their corresponding signaling data, wherein each signaling unit includes overhead information including a start and an end flags, check bits, and information representing the sequence thereof; and interfacing means for interfacing the plurality of signaling units to the first set of signaling links, respectively, to thereby transmit the plurality of signal units to other ESS's.

2. The apparatus of claim 1, wherein said forming means includes a plurality of forming devices arranged in parallel, each of said forming devices generating each corresponding formed signaling unit by using its corresponding signaling data and converting the transfer rate of the formed signaling unit to a predetermined identical transfer rate.

3. The apparatus of claim 2, wherein said interfacing means includes:

means for buffering the plurality of signaling units formed at the forming devices; and means for converting the level of each signaling unit outputted from the buffering means to a predetermined level.

4. The apparatus of claim 2, wherein said forming means for forming the plurality of signaling units is operated based on a signaling system number 7 protocol.

5. The apparatus of claim 2, wherein said predetermined identical transfer rate is 2.048 Mbps.

6. An apparatus, for use in an electronic switching system (ESS), for processing a plurality of signaling units received by the ESS through a first set of signaling links from at least one other ESS, wherein each of the plurality of signaling units represents control information employed for the management of communication networks formed therebetween, which comprises:

interfacing means for receiving the plurality of signaling units from the first set of signaling links and for interfacing them to a second set of signaling links, respectively, wherein each signaling unit includes overhead information such as a start and an end flags, check bits, and information representing the sequence thereof;

first conversion means for converting each signaling unit to a corrected signaling unit based on the overhead information, respectively, to thereby generate a plurality of corrected signaling units;

means for determining whether or not each corrected signaling unit includes signaling data, the signaling data having user data, its signaling link code and destination point code, and service indicator data;

means, if said each corrected signaling unit includes signaling data, for discriminating whether it is delivered to its destination or not in response to the destination point code contained therein; and means, if said each corrected signaling unit is delivered to its destination, for distributing it to a corresponding user part included in the ESS in response to the service indicator data contained therein, and, if otherwise, for routing it to a corresponding ESS in response to the signaling link code contained therein.

7. The apparatus of claim 6, wherein said first conversion means includes a plurality of conversion devices arranged in parallel, each of said conversion devices converting the transfer rate of each corresponding signaling unit to a predetermined identical transfer rate and outputting each corresponding corrected signaling unit based on the overhead information.

8. The apparatus of claim 7, wherein said interfacing means includes:

second conversion means for converting the level of each signaling unit from the first set of signaling links to a predetermined level; and means for buffering the plurality of signaling units converted by the conversion means to interface them to the second set of signaling links, respectively.

9. The apparatus of claim 7, wherein said predetermined identical transfer rate is 64 Kbps.

* * * * *